United States Patent Office 3,826,796
Patented July 30, 1974

3,826,796
p-GLU-HIS-LEU-ARG-PRO-GLY-NH₂ AND
INTERMEDIATES
Dimitrios Sarantakis, Audubon, William H. McGregor,
Malvern, and Wayne A. McKinley, Wallingford, Pa.,
assignors to American Home Products Corporation,
New York, N.Y.
No Drawing. Filed Dec. 20, 1972, Ser. No. 317,042
Int. Cl. A61k 27/00; C07c 103/52; C07g 7/00
U.S. Cl. 260—112.5                              3 Claims

ABSTRACT OF THE DISCLOSURE

The novel hexapeptide p-Glu-His-Leu-Arg-Pro-Gly-NH₂ and intermediates used in the synthesis thereof are described. This hexapeptide inhibits the release of luteinizing hormone.

This invention relates to novel hexapeptides, processes for their preparation and uses for such peptides.

The present invention relates to the hexapeptide p-Glu-His-Leu-Arg-Pro-Gly-NH₂ (I) and its non-toxic salts and to intermediates of the formula p-Glu-His($N^{im}$-$R^2$)-Leu-Arg-($N^G$-$R^3$)-Pro-Gly-R  (II)

wherein:

R is selected from the class consisting of —NH₂ and OR¹;

R¹ is selected from the class consisting of C₁–C₆ alkyl (e.g. methyl, ethyl, propyl, etc.), benzyl, substituted benzyl wherein the substituent is selected from at least one of nitro, methoxy, and methyl (e.g. p-methoxybenzyl, p-nitrobenzyl, 2, 4-dimethoxybenzyl, 2, 4, 6-trimethylbenzyl), phenacyl, phthalimido methyl, β-methylthioethyl, 4-picolyl and 4-(methylthio)phenyl. Preferably R¹ is C₁–C₆ alkyl, benzyl or substituted benzyl;

$N^{im}$ refers to the nitrogen atoms of the imidazole ring of histidine;

$N^G$ refers to the side chain nitrogen atoms in arginine;

R² is hydrogen or a protecting group for the imidazole nitrogens selected from the class consisting of tosyl, benzyl, trityl, 2,2,2-trifluoro-1-benzoyloxycarbonylaminoethyl and 2,2,2 - trifluoro - 1 -tert - butyloxycarbonylaminoethyl;

R³ is hydrogen or a protecting group for the $N^δ$, $N^ω$ and $N^{ω'}$ nitrogen atoms of arginine with the proviso that if R² and R³ are both hydrogen R is OR¹.

Nomenclature used for peptides is described by Schroder and Lubke, The Peptides, 1, pages viii–xxix (Academic Press 1965), and in Biochemistry, 11, pp. 1726–1732 (1972).

The hexapeptide I may be synthesized according to the following reaction scheme.

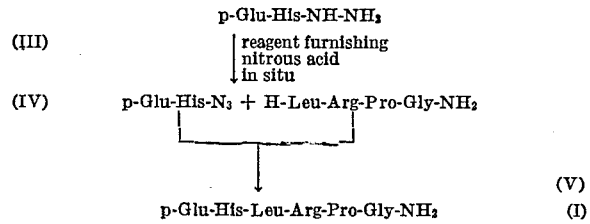

In the foregoing reaction scheme the dipeptide 5-oxoprolyl-histidine hydrazide (III) is converted to the corresponding azide of formula (IV) by reaction with a reagent which furnishes nitrous acid in situ. Suitable reagents for this purpose include a lower alkyl nitrite (e.g. tert-butyl nitrite, isoamyl nitrite) or an alkali metal nitrite salt (e.g. sodium nitrite, potassium nitrite, in the presence of a strong acid such as hydrochloric, phosphoric, sulfuric, etc. This reaction is carried out in the presence of either water and/or a non-aqueous solvent such as dimethylformamide, tetrahydrofuran, dioxane, chloroform, methylene chloride, toluene, etc. at a temperature between about —40° C. and +20° C. The azide of formula IV, which is preferably not isolated from the reaction medium is then coupled with the tetrapeptide of formula (V) to yield the hexapeptide of formula (I) in the form of an acid addition salt, this reaction being carried out between about —40° C. and +50° C., preferably between about —25° C. and +10° C. An acid acceptor is present in the reaction medium if the tetrapeptide of formula V is added to the reaction vessel in the form of its acid addition salt (e.g. HBr, HCl, acetate, etc.) in order to liberate the free base (V) in situ which reacts with the azide (IV). Suitable acid acceptors include tertiary amines (e.g. triethylamine, pyridine, quinoline, dimethylaniline, etc.), alkali metal carbonates or other acid binding agents known in the art.

The starting materials of formula III may be prepared according to well known procedures such as by reacting pyroglutamic acid (ε.5-oxoproline) with a carbonyl group activation reagent (e.g. N,N¹ dicyclohexylcarbodiimide, N,N - dibenzylcyanamide, N,N¹ - carbonyl diimidazole, ethylchloroformate, isobutyl chloroformate, N-hydroxysuccinimide, 1-hydroxybenzotriazole). The activated intermediate is then coupled with a carboxylic acid ester of histidine (e.g. histidine methyl ester) at a temperature between about —40° C. and +20° C. The resulting dipeptide p-Glu-His-OMe is then converted to the hydrazide III by reaction with hydrazine in alcoholic solution. The tetrapeptide (V) may be prepared by the procedures desired in copending application Ser. No. 293,715 filed Sept. 29, 1972, the disclosure of which is incorporated herein by reference.

Alternatively, the hexapeptide of formula (I) can be obtained by reacting p-Glu-His($N^{im}$-$R^2$)-N₃(IVa) with a tetrapeptide of the formula H-Leu-Arg($N^G$-$R^3$)-Pro-Gly-NH₂(Va)

to form the novel hexapeptide p-Glu-His($N^{im}$-$R^2$)-Leu-Arg($N^G$-$R^3$)-Pro-GlyNH₂(Ia).

Thereafter, the protecting group R³ on the side chain nitrogen atoms of arginine is cleaved. The protecting group R³ on the $N^δ$, $N^ω$ and $N^{ω'}$ of arginine is illustrated by nitro, tosyl, benzyloxycarbonyl, adamantyloxycarbonyl and trityl. In the case of nitro or tosyl the protecting group is on either one of the $N^ω$, $N^{ω'}$ nitrogens and in the case of benzyloxycarbonyl, trityl and adamantyloxycarbonyl, the protecting group is on the $N^δ$ nitrogen and either one of the $N^ω$, $N^{ω'}$ nitrogen atoms. A suitable process for removing nitro protecting groups is hydrogenation over a palladium catalyst. Other cleaving reagents may be used such as HBr in acetic acid, alcoholic solution of HCl, sodium in liquid ammonia and trifluoroacetic acid, depending on the particular protecting group on arginine.

A further modification of the present invention is to prepare the novel hexapeptide I from the reaction of p-Glu-His($N^{im}$-$R^2$)-N₃ (IVa) with a tetrapeptide H-Leu-Arg($N^G$-$R^3$)-Pro-Gly-OR¹ (Vb) to form the novel intermediates p-Glu-His($N^{im}$-$R^2$)-Leu-Arg-($N^G$-$R^3$)-Pro-Gly-OR¹ (Ib)

wherein R¹, R² and R³ have the same meaning as previously defined. Preferably R¹ is lower alkyl, benzyl or substituted benzyl. Thereafter, the ester terminated hexapeptide (Ib) may be converted to the C-terminated amide (Ia) by treating the ester with ammonia in alcoholic solution between 0° C. and room temperature or saponification of the ester to the free acid followed by formation of the mixed anhydride which in turn is reacted with ammonia to form the C-terminated amide. Alternatively the hexapeptide (Ib) may be first deprotected as previously described and then converted to the C-terminated amide (I).

The following examples are illustrative of the preferred process for preparing the hexapeptides of the present invention.

EXAMPLE 1

L-(5-Oxoprolyl)-L-histidine methyl ester

L-5-Oxoproline (13 gr. 0.1 mole) and L-histidine methyl ester dihydrochloride (22.8 gr. 0.1 mole) are suspended in dimethylformamide (200 ml.). The mixture is treated with triethylamine (27 ml., 0.2 moles) and cooled at $-15°$ C., then dicyclohexylcarbodiimide (20.6 gr. 0.1 mole) is added and the mixture is stirred for 2 hours at $-5°$ C. and overnight at room temperature. The dicyclohexylurea which separates is filtered off and the filtrate is evaporated to dryness. The residue is triturated with water and the insoluble solid is filtered off. The filtrate is evaporated to dryness and the residue dried twice with abs. ethanol. The oily residue crystallizes from abs. ethanol. EtOH to afford the above titled dipeptide methyl ester 13 g. (45%), m.p. 198–199° C.; $[\alpha]_D^{22}$ $-4.3$ (c. 1, Methanol); $R_f$ (n-Butanol-water-acetic-acid 4:1:1) 0.30; $R_f$ (n-Butanol-water-acetic acid-pyridine 30:24.6.20) 0.50; single spot with Pauly and $I_2$ reagents.

Anal. Cald. for $C_{12}H_{16}N_4O_4$ (280.28): C 51.42, H 5.75, N 19.99. Found: C 51.34, H 6.04, N 20.12

EXAMPLE 2

L-(5-Oxoprolyl)-L-Histidyl hydrazide

L-(5-Oxoprolyl)-L-histidine methyl ester of Example 1 (10 gr. 0.036 moles) is dissolved in methanol (150 ml.) and treated with hydrazine hydrate 99% (8 ml.) at $-10°$ C. for one hour then at room temperature overnight. The white solid which separates is filtered and washed with methanol and then with ether. Recrystallization from water-ethanol affords the above-titled dipeptide hydrazide 8.8 gr. (88%—recrystallization from water-ethanol [78%] m.p. 241.5–242° C.; $[\alpha]_D^{22}$ $-14.50$ (c. 1, $H_2O$); $R_f$(n-Butanol-water-acetic acid 4:1:1) 0.05; $R_f$(n-Butanol-water-acetic acid-pyridine 30:24:6:20) 0.10; single spot with Pauly and $I_2$ reagents.

EXAMPLE 3

N-Benzyloxycarbonyl-$N^G$ nitro-L-arginyl-L-proline methyl ester

N-Benzyloxycarbonyl-$N^G$-nitro-L-arginine (35.3 gr., 0.1 mole) is dissolved in 10% dimethylformamide in dichloromethane (ca. 150 ml.) and cooled to $-15°$ C., then N-methyl-morpholine (11.1 ml., 0.1 mole) is added followed by isobutylchloroformate (13.4 ml., 0.1 mole) while the mixture was kept cold. After 5 minutes a cold solution of L-proline methyl ester hydrochloride (16.5 gr., 0.1 mole) and triethylamine (13.6 ml., 0.1 mole) in dimethylformamide is added. The temperature is brought to 0° C. and maintained there for 1 hour, then allowed to rise to room temperature and remain there for 18 hours.

The mixture is filtered and the filtrate concentrated under reduced pressure at 30° C. The residue is taken up in 1:1 ethyl acetate/n-butanol and washed with 5% $KHSO_4$, water, aq. $NaHCO_3$, brine. The organic phase is dried over $Na_2SO_4$, filtered and concentrated in vacuo until a solid starts to precipitate. The solution is cooled to 0° C. and left for 18 hours, then the crystalline compound which separated is filtered. Yield 16.3 gr. (35%) of the above titled product.

On further concentration of the mother liquor a second crop was obtained 18.7 gr. (40%) m.p. 154–156° C.; $[\alpha]_D^{25}$ $-46.7$ (c. 0.5, methanol); $R_f$ (Chloroform-methanol 9:1) 0.6.

EXAMPLE 4

$N^G$-Nitro-L-arginyl-L-proline methyl ester, hydrobromide

N-Benzyloxycarbonyl-$N^G$-nitro - L - arginyl-L-proline methyl ester (16.3 gr., 35.1 mmoles) of Example 9 is treated with 30% hydrobromic acid in glacial acetic acid (50 ml.) for one hour and at room temperature. Dry ether (ca. 500 ml.) is added to give a pale yellow very hygroscopic solid. The product is not characterized further due to the very hygroscopic nature. It is dried in vacuo over KOH and used for the next reaction.

EXAMPLE 5

N-Benzyloxycarbonyl-L-leucyl-$N^G$-nitro-L-arginyl-L-proline methyl ester

N-Benzyloxycarbonyl-L-leucine (8.84 gr., 33.4 mmoles) is dissolved in tetrahydrofuran (100 ml.) and cooled to $-15°$ C. N-methylmorpholine (3.73 ml., 33.3 mmoles) is added, followed by isobutylchloroformate (4.35 ml., 33.3 moles). After five minutes at $-15°$ C., a solution of $N^G$-nitro-L-arginyl-L-proline methyl ester hydrobromide from Example 4 in dimethylformamide and adjusted to pH 7.5 with triethylamine, is added (during the neutralization the solution is kept at 0° C.). The reaction mixture is kept at 0° C. for one hour, then allowed to rise to room temperature slowly and remain there for 18 hours after which time the solvent is removed in vacuo and at 30° C. The residue is taken up in ethyl acetate/n-butanol, 2:1, and washed with 5% $KHSO_4$, water, aq. $KHCO_3$, brine. The organic phase is dried over sodium sulfate, filtered and concentrated under reduced pressure at 30° C. The resulting gum is taken up in ethyl acetate and precipitated with ether. A white solid of the above-identified product is obtained, 13.11 gr. (68%). m.p. 93–96° C.; $[\alpha]_D^{25}$ $-50.46$ (c. 0.34, Methanol); $R_f$ Chloroform-methanol 9:1) 0.70.

EXAMPLE 6

N-Benzyloxycarbonyl-L-leucyl-$N^G$-nitro-L-arginyl-L-proline

N-Benzyloxycarbonyl-L-leucyl - $N^G$ - nitro-L-arginyl-L-proline methyl ester (13 gr., 23 mmoles) of Example 5 is dissolved in 1:1 dioxane/N-sodium hydroxide (50 ml.) and stirred for 2 hours at room temperature. Thin layer chromatography shows no starting material present. The solution is adjusted to pH 6.5 with 1.5 N-hydrochloric acid and concentrated in vacuo at 30° C. to a small volume. The residue is diluted with water (ca. 200 ml.) and cooled to 0° C., then acidified to pH 3 with 1.5 N hydrochloric acid. The white solid which crystallizes out is collected and washed with cold water 11.8 gr. (92%); $[\alpha]_D^{25}$ $-54.84$ (c. 1, methanol); $R_f$ (n-Butanol-water-acetic acid-pyridine 30:24:6.20) 0.70.

EXAMPLE 7

N-Benzyloxycarbonyl-L-leucyl-$N^G$-nitro-L-arginyl-L-prolyl-glycine amide

N-Benzyloxycarbonyl-L-leucyl - $N^G$ - nitro-L-arginyl-L-proline (5.64 gr., 10 mmoles) of Example 6 is dissolved in tetrahydrofuran (ca. 50 ml.) and cooled to $-15°$ C., then N-methylmorpholine (1.12 ml., 10 mmoles) is added followed by isobutylchloroformate (1.31 ml., 10 mmoles). After five minutes at $-16°$ C. a cold mixture of glycine amide hydrochloride (2.11 gr., 20 mmoles) and triethylamine (2.78 ml., 20 mmoles) in dimethylformamide is added. The temperature is maintained at 0° for one hour, then allowed to warm to room temperature where it remained for 18 hours.

The reaction mixture is filtered and concentrated in vacuo at 30° C. and the residue is taken up in ethyl acetate/n-butanol 1:1 and washed with 5%, $KHSO_4$, water, aq. $KHCO_3$, brine. The organic phase is dried over $Na_2SO_4$, filtered and concentrated under reduced pressure at 30° C. to a gum. This gum is taken up in ethanol (ca. 20 ml.) filtered and a white solid which is the above-titled product precipitates with ether. 5.85 gr. (94%) $[\alpha]_D^{25}$ —46.37 (c. 1 methanol); $R_f$ (Chloroform-methanol 9:1) 0.26.

EXAMPLE 8

L-Leucyl-$N^G$-nitro-L-arginyl-L-prolyl-glycine amide hydrobromide

N-Benzyloxycarbonyl-L-leucyl-$N^G$-nitro - L - arginyl-L-prolylglycine amide (2 gr., 3.24 mmoles) of Example 7 is treated with anhydrous HBr in acetic acid 30% (50 gr.) for 5 minutes in an ice bath, then for one hour at room temperature. An excess of sodium dry ether is added to give a white, very hygroscopic, solid precipitate which is filtered and dried in vacuo over $P_2O_5$ and NaOH; $R_f$ (n-Butanol-water-acetic acid 4:1:1) 0.20; $R_f$ (n-Butanol-water-acetic acid-pyridine 30:24:6:20) 0.75.

EXAMPLE 9

L-Leucyl-L-arginyl-L-prolyl-glycine amide, diacetate

N - Benzyloxycarbonyl-L-leucyl-$N^G$-nitro - L - arginyl-L-prolylglycine amide (800 mgr., 1.3 mmoles) is dissolved in 20% methanol in glacial acetic acid (ca. 30 ml.) with a trace of water present (ca. 1 ml.) and hydrogenated for 24 hours in the presence of 10% palladium on carbon (500 mgr.). The mixture is filtered and concentrated under reduced pressure at 30° C. to a gum. This gum is taken up in absolute ethanol and a solid precipitates out with dry ether. $R_f^3$ (cellulose) 0.60.

EXAMPLE 10

L-(5-Oxoprolyl)-L-Histidyl-L-Leucyl-Arginyl-L-Prolyl-glycine amide diacetate Salt L-(5-oxoprolyl)-L-histidine hydrazide (140 mgr., 0.5 mmoles) of Example 2 is dissolved in dimethylformamide (50 ml.) and 2.5 ml. of 0.8 N, HCl in tetrahydrofuran and cooled to —20° C. then isoamyl nitrite (0.102 ml.) is added and the mixture is stirred for 15 minutes.

Triethylamine is added until the pH of the solution is 7.5 and then a cold solution of L-leucyl-L-arginyl-L-prolyl-glycine amide diacetate (264 mgr., 0.5 mmoles) of Example 9 in dimethyl formamide and triethylamine (0.139 ml., 1 mmole) is added. The mixture is stirred for one hour at —20° C. and then at 0° C. for two days.

The solid which separates is filtered off and the filtrate is evaporated in vacuo. The residue is solidified on trituration with ether to a slightly colored solid. The yield is 450 mg. (the excess weight is triethylamine hydrochloride).

The crude product is purified by preparative thick layer chromatography on cellulose plates and with the elution system n-butanol/water/glacial acetic acid/pyridine (4:2:1:1) to afford a pure product. Yield 94 mg.

$R_f$ (n-butanol/water/glacial acetic acid/pyridine, 4:2:1:1) 0.55; Pauly and Sakaguchi reagent positive test.

Anal. Calcd. for $C_{30}H_{48}N_{12}O_7$: $2C_2H_4O_2 4H_2O$: C 46.36, H 7.32, N 19.08. Found: C 46.03, H 7.26, N 18.79.

The compound of Example 10 was tested for its ability to release luteinizing hormone from the pituitary. These tests were performed in rat tissue cultures modeled after those of Vale, et al. (Endocrinology 91: 562, 1972 and Science 176: 933, 1972). The amount of hormone released was determined by radioimmunoassay (Berson et al., Metabolism 13: 1135, 1964). When added to the culture cells at molar ratios between $2 \times 10^2$ to $2 \times 10^4$ that of the luteinizing hormone releasing factor (LRF), the compound of Example 10 decreased the amount of luteinizing hormone secreted in response to the releasing factor at a dose 1 μg./ml. As an antagonist to release of LH, the hexapeptide has application in the field of ovulation control in mammals since LH is known to trigger ovulation in mammals (see Schally et al., Am. J. Obstet. Gynecol pp. 420–442 (Oct. 1, 1972).

The compound of Example 10 may be administered to mammals intravenously or subcutaneously.

What is claimed is:

1. A compound selected from those of the formula:

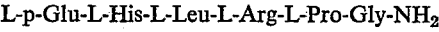

and

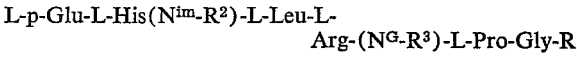

and its non-toxic salts; wherein R is selected from the class consisting of —$NH_2$ and $OR^1$; $R^1$ is selected from the class consisting of $C_1$–$C_6$ alkyl, benzyl and substituted benzyl, said substituent being selected from nitro, methyl and methoxy; $R^2$ is selected from the class consisting of hydrogen and a protecting group for the imidazole nitrogens in histidine selected from the class consisting of tosyl, benzyl, trityl, 2,2,2-trifluoro-1-benzoyloxycarbonylaminoethyl and 2,2,2-trifluoro-1-tert-butyloxycarbonylaminoethyl; $R^3$ is a protecting group for the $N^\delta$, $N^\omega$ and $N^{\omega'}$ nitrogen atoms of arginine selected from the class consisting of nitro, tosyl, benzyloxycarbonyl, adamantyloxycarbonyl and trityl.

2. A compound according to claim 1 wherein R is $OR^1$ and $R^1$ is $C_1$–$C_6$ alkyl or benzyl.

3. A compound selected from the class consisting of L-(5-oxoprolyl)-L-Histidyl - L - Leucyl - L - Arginyl-L-Prolyl-Glycine amide and its non-toxic salts.

References Cited

Chang et al., J. Med. Chem., 15, 623–7 (1972).

LEWIS GOTTS, Primary Examiner

R. J. SUYAT, Assistant Examiner

U.S. Cl. X.R.

424—177